United States Patent

Balogh, Jr.

[15] 3,638,198

[45] Jan. 25, 1972

[54] PRIORITY RESOLUTION NETWORK FOR INPUT/OUTPUT EXCHANGE

[72] Inventor: Edward Balogh, Jr., Diamond Bar, Calif.

[73] Assignee: Burroughs Corporation, Detroit, Mich.

[22] Filed: July 9, 1969

[21] Appl. No.: 840,208

[52] U.S. Cl. ....340/172.5

[51] Int. Cl. ....G06f 3/00

[58] Field of Search ....340/172.5

[56] References Cited

UNITED STATES PATENTS

| | | | |
|---|---|---|---|
| 3,253,262 | 5/1966 | Wilenitz et al. | 340/172.5 |
| 3,274,554 | 9/1966 | Hopper et al. | 340/172.5 |
| 3,286,240 | 11/1966 | Thompson et al. | 340/172.5 |
| 3,449,722 | 6/1969 | Tucker | 340/172.5 |
| 3,449,724 | 6/1969 | Boland et al. | 340/172.5 |
| 3,478,321 | 11/1969 | Cooper et al. | 340/172.5 |
| 3,307,150 | 2/1967 | Bartlett | 340/172.5 |

*Primary Examiner*—Raulfe B. Zache
*Assistant Examiner*—Harvey E. Springborn
*Attorney*—Christie, Parker & Hale

[57] ABSTRACT

There is described a circuit for resolving priority between a number of requesting units and a number of accessible units in which priority is normally assigned on a first-come, first-served basis, but in which priority between substantially simultaneous requests for the same accessible unit is assigned in a predetermined sequence. Requests made to the other accessible units during priority resolution may be serviced out of sequence. The circuit is modular for both a number of requesting units and a number of accessible units.

8 Claims, 5 Drawing Figures

INVENTOR.
EDWARD BALOGH, Jr.
BY
Christie, Parker & Hale
ATTORNEYS

PRIORITY RESOLUTION NETWORK FOR INPUT/OUTPUT EXCHANGE

FIELD OF THE INVENTION

This invention relates to input/output exchanges for data processing systems, and more particularly, is concerned with a priority resolution circuit for assigning priority to a number of requesting units on a first-come, first-served basis.

DESCRIPTION OF THE PRIOR ART

In complex data processing systems, it is well known to provide several processors which process data stored in a number of data storage units. Communication between the processors, as the requesting units, is through an exchange, usually in the form of a cross-point matrix, by means of which a communication link may be completed with any one of a plurality of accessible storage units. Control of such an exchange usually includes some means of resolving the order in which the requests are serviced and establishing the priority in which requests for access to the same unit are resolved. One commonly used arrangement is to provide circuitry which always gives priority on a predetermined basis. In such an arrangement, one particular requestor always takes priority over lower order priority requestors but may be locked out by higher priority requesting units. This means that if a particular storage unit is continually accessed by higher priority requesting units, lower priority requesting units may never be serviced.

Another priority circuit arrangement provides for servicing the requesting units in sequence. Thus, when one requesting unit completes communication with a particular storage unit, the next requesting unit in the sequence gains access to that storage unit. While such an arrangement prevents a particular requesting unit from being locked out due to its low priority assignment, the sequential system makes no allowance for the order in which the requests for access are received.

SUMMARY OF THE INVENTION

The present invention involves a priority-resolving control circuit for arranging communication paths between a plurality of requesting units and a plurality of accessible storage units in which requests for access to a particular storage unit are resolved on a first-come, first-served basis.

This is accomplished, in brief, by utilizing a stack register in which are stored the designations of requesting units seeking access to a particular storage unit that is not available when the requests are received. The designations are stored in the order in which they are received. Whenever a particular storage unit becomes available, access is granted to the highest priority requesting unit as determined by the order in which the designations are stored in the stack register. Simultaneous requests are resolved by a scanner which permits only one request to be serviced at a time. Whenever a request for access to a particular storage unit is received, the control circuit determines if the storage unit is available for access. If not, the designation of the requesting unit is placed in the stack register in the highest available priority position. When the storage unit is available, the designations in the stack register are examined in the sequence received, and access granted to the highest priority requesting unit. The designation of the contending requesting units stored in the stack register are then shifted to higher priority positions in the stack register. The requesting units whose designations are stored in the stack memory are serviced automatically whenever the requested storage unit becomes available.

BRIEF DESCRIPTION OF THE DRAWINGS

For a better understanding of the invention, reference should be made to the accompanying drawings, wherein.

DETAILED DESCRIPTION

Figure 1:
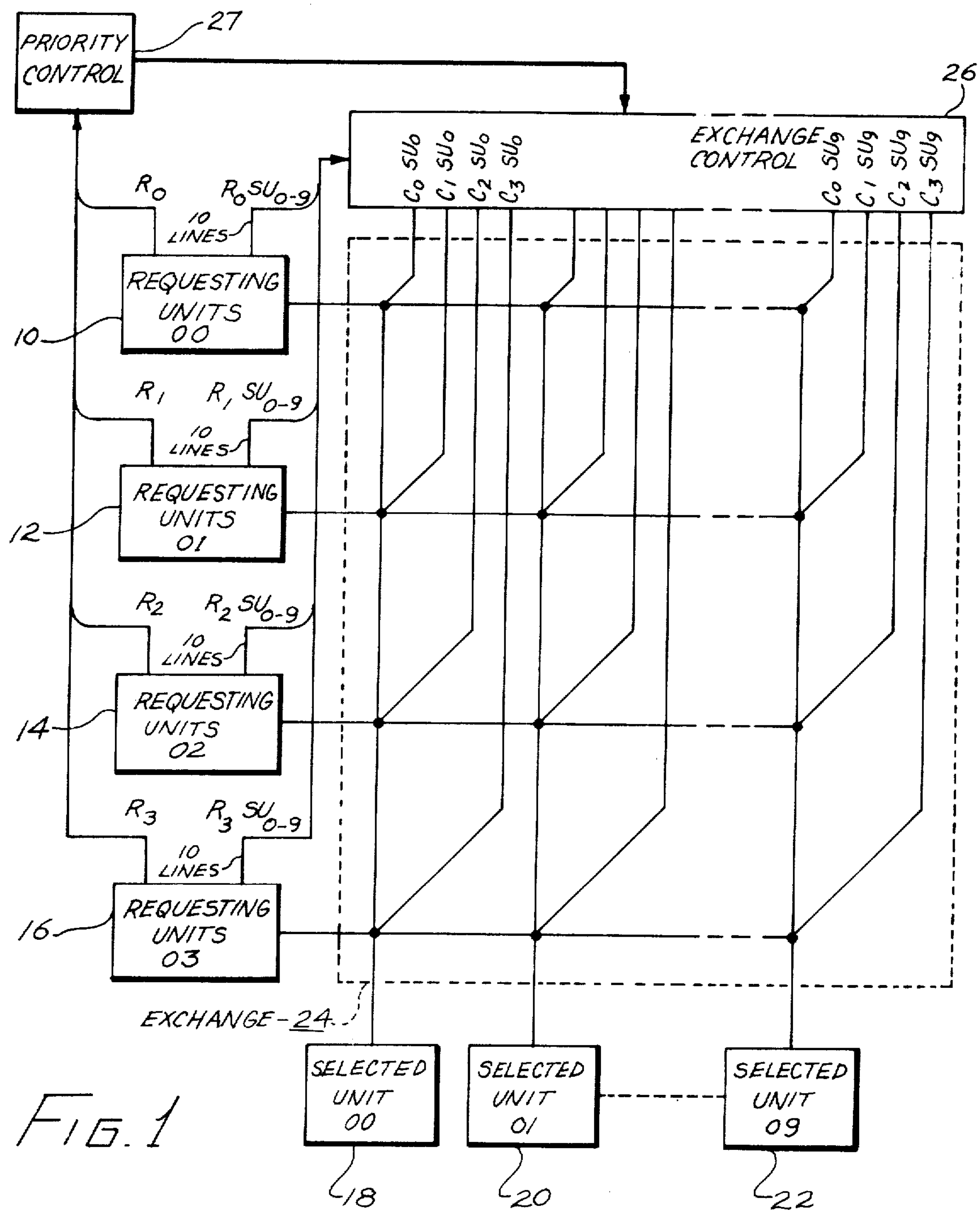
FIG. 1 is a simplified schematic showing of a communication system in which the priority control of the present invention is used.
Figure 3:
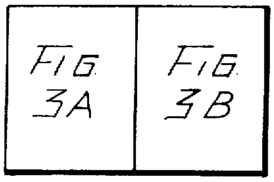
FIG. 3A and FIG. 3B together provide a detailed block diagram of the priority control circuit.

Referring to FIG. 1, there is shown a communication system in which, by way of example, four requesting units, indicated at 10, 12, 14, and 16, may respectively communicate with any one of 10 selected units, three of which are indicated at 18, 20, and 22. Communication is through an exchange 24 which includes a 4×10 cross-point matrix, and an exchange control circuit 26 controls switches at each of the cross points of the matrix to establish communication between any one of the requesting units and any one of the accessible units. The exchange control unit 26, as hereinafter more fully described, receives a separate request signal from each of the requesting units seeking a connection to one of the accessible units, the request signals appearing on the output lines $R_1$, $R_2$, $R_3$, and $R_4$, respectively, together with information designating the particular unit selected, as indicated by output lines $R_0SU_{0\text{-}9}$, $R_1SU_{0\text{-}9}$, $R_2SU_{0\text{-}9}$, $R_3SU_{0\text{-}9}$. The exchange control 26 activates up to four of 40 output lines, designated $C_0SU_0$, $C_0SU_1$...$C_3SU_9$, to complete connections at selected cross points of the 4×10 exchange matrix 24. A priority control circuit incorporating the features of the present invention, as indicated at 27, responds to the requesting units and resolves priority between requesting units seeking communication with the same selected unit on a first-come, first-served basis, and also between simultaneous requests.

Figure 2:
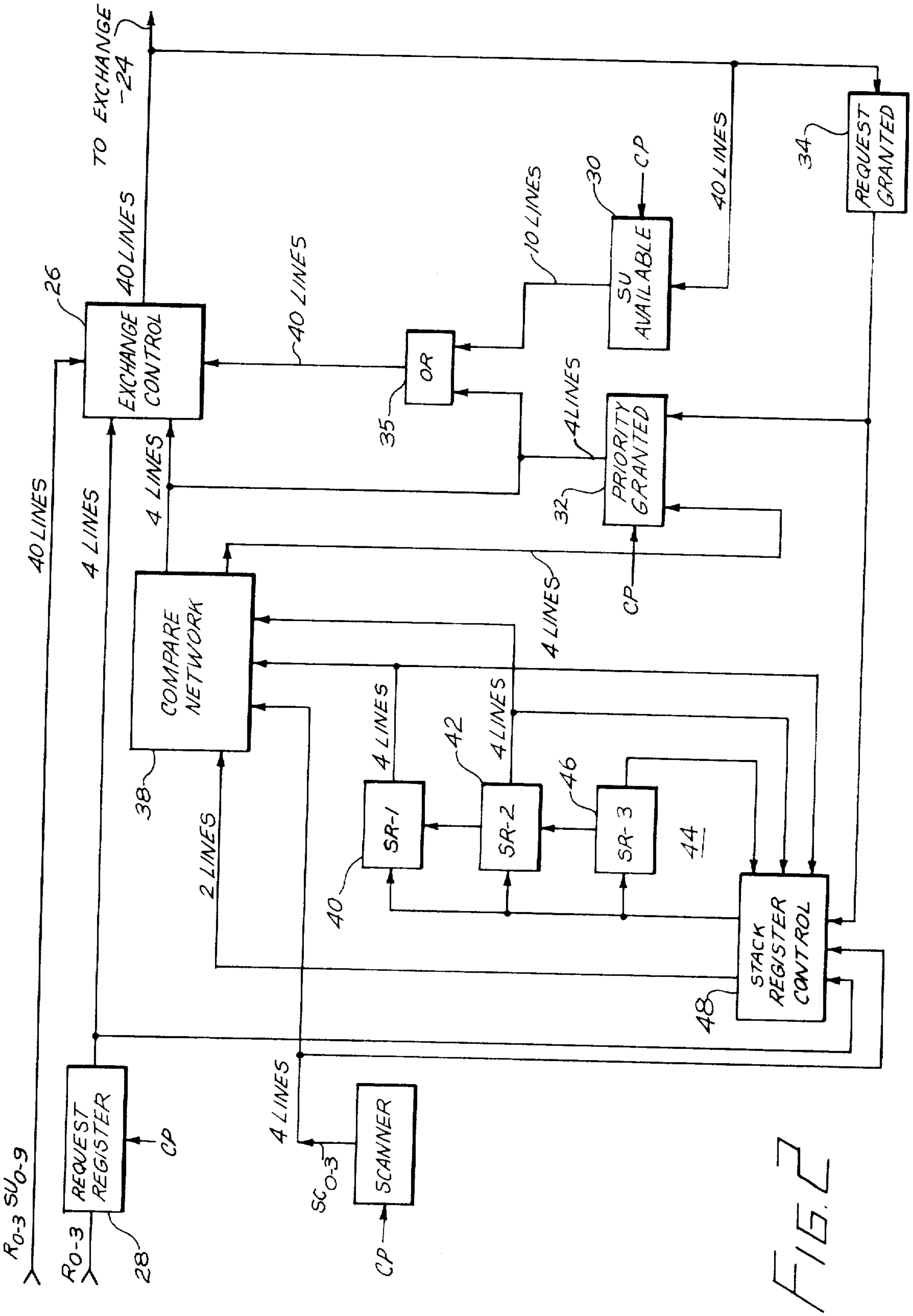
FIG. 2 is a simplified block diagram of the priority control and exchange control of FIG. 1.

To understand the operation of the priority control 27, the block diagram of FIG. 2 shows the principal functional components of the priority control circuit. The request lines $R_{0\text{-}3}$ from the four requesting units are applied to a request register 28 which stores each of the requests in synchronism with a clock pulse CP from a suitable clock pulse source (not shown). Four lines from the output of the request register 28 are applied to the exchange control 26 to indicate which units are requesting communication through the exchange. Also applied to the exchange control 26 are the 40 lines, 10 from each requesting unit, designating which units are to be selected by the exchange control for communication with the requesting units.

A register 30, designated the SU Available register, has 10 output lines and is arranged to store information designating which of the 10 accessible units is available for the setting up of a new communication link by the exchange control 26. The SU Available register 30 is controlled by the output of the exchange control 26 such that when the exchange control sets up a communication link with any selected unit, the corresponding one of the 10 flip-flops in the register 30 is turned off, indicating that that accessible unit is no longer available but is busy.

The priority control circuit is also provided with a Priority Granted register 32 having four output lines which designate, respectively, which ones of the requesting units have been granted priority and are in communication with the accessible storage units. The Priority Granted register 32 has the respective ones of four flip-flops turned on whenever the output of the exchange control 26 indicates that a request has been granted to a corresponding one of the four requesting units. A Request Granted circuit 34 looks at all 40 lines from the output of the exchange 26 to determine which ones of the four requesting units are linked to selected units through the exchange 24 by the output lines of exchange control 26, and sets the flip-flops in the register 32.

An OR-circuit 35 looks at all combinations of the outputs of the registers 30 and 32, providing a "true" level on a selected group of four of 40 output lines for each accessible unit that is available and providing a "true" level on 10 of the 40 lines for each requesting unit that has been granted priority.

Resolution of conflicting requests and a granting of priority is under the control of a scanner 36, which may, for example, be a ring-type counter synchronized with the clock pulse CP and which has four output states. These four lines are applied to a Compare network 38 having four output lines coupled to the exchange control 26. The Compare network 38 is also coupled to the four output lines, respectively, from the two highest priority sections 40 and 42 of a priority stack register 44. The first or highest priority section is designated SR-1 and the next highest priority section is designated SR-2. The stack register includes a third highest priority section 46, designated SR-3. Under the operation of a stack register control circuit 48, whenever a request is received from one or more requesting units seeking communication with an accessible unit which is not available, the identifying number of each such requesting unit is stored in the stack register starting with the highest priority section SR-1. Where requests are received simultaneously, the order of priority is determined by the scanner 36. The Compare network 38 in combination with the stack register control 48 honors requests in the following order: the requesting unit whose number is stored in SR-1, the requesting unit whose number is stored in SR-2, and finally the requesting unit whose number is pointed to by the scanner 36. If communication is completed, the stack register control 48 adjusts the stack register so as to cancel the number of that requesting unit from the register and shifting the register to move the lower priority requesting unit numbers to a higher priority position in the stack register.

Figure 3A:
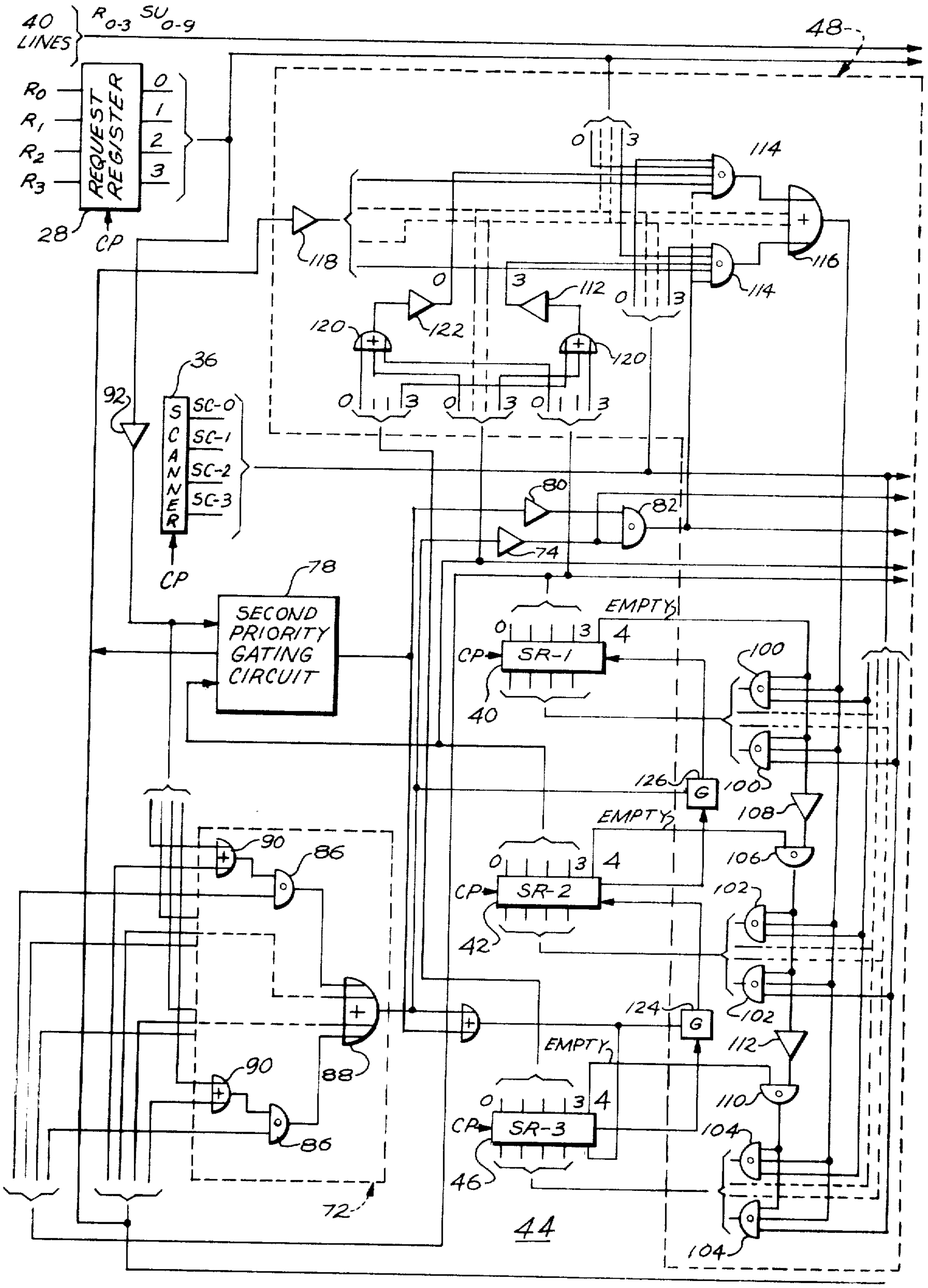
Figure 3B:
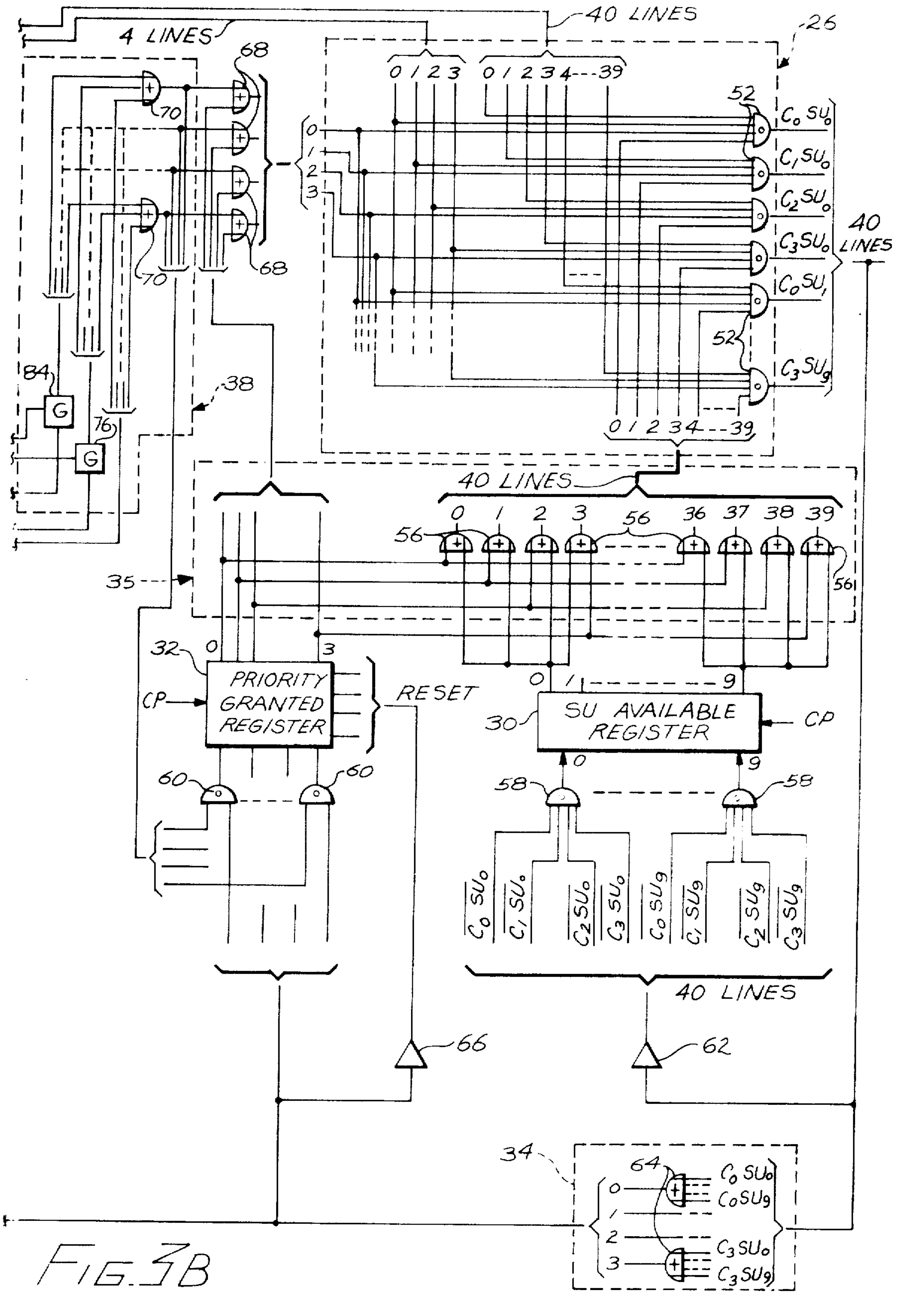

Referring to FIGS. 3A and 3B, there is shown a more detailed block diagram of the logic of the circuit of FIG. 2. The exchange control circuit 26 comprises 40 AND circuits, six of which are indicated at 52. The AND circuits are arranged in 10 groups of four. Each of the 40 AND circuits has four input lines, one input of each AND gate is one of the 40 lines from the requesting units. The second input is one of the 40 lines from the OR-circuit 35. The third input is one of the four lines from the request register, with one of said lines going to a corresponding one of the four AND circuits in each of the 10 groups. The fourth input is one of the four lines from the compare network 38, again with one of said lines going to a corresponding one of the four AND circuits in each of the 10 groups. The outputs of the AND circuits of the exchange control 26 are connected to the respective ones of the 40 cross points of the exchange matrix 24 to selectively control the cross-point switching and complete communication between any one of the requesting units and any one of the accessible units. In response to the four inputs, the output of a particular AND-circuit 52 is "true" when four conditions are satisfied, namely, a particular requesting unit is requesting communication with a particular selected unit, the particular selected unit is available or the particular requesting unit has been granted priority, the Request register 28 has been set by the particular requesting unit, and the Compare network 38 has assigned priority to the particular requesting unit.

The OR-circuit 35 consists of 40 inclusive OR circuits, two of the 10 groups being indicated at 56 in FIG. 3B. The OR circuits are arranged in 10 groups of four each. The 10 output levels from the SU Available register 30 are respectively connected to the four OR circuits in each group, while the four outputs of the Priority Granted register 32 are connected, respectively, to the four OR circuits of each group. The register 30 identifies which of the 10 selected units is available to the requesting units. The Priority Granted register 32 indicates which of the four requesting units has been granted priority to complete communication through the cross-point matrix with its selected unit.

Each bit position of the SU Available register 30 is set to 1, i.e., turned "on," by a clock pulse CP by the "true" level from the output of a logical AND circuit. The AND circuits for only the lowest order and highest order position of the 10 bits in the register 30 are indicated in FIG. 3B at 58. The AND-gates 58, respectively, sample the outputs of four of the output lines from each of the groups of AND circuits in the exchange control circuit 26 through an inverter circuit 62. Thus, the output of the AND-gates 58 are "true" when the respective four lines from the output of the exchange control circuit 26 are all "false," indicating that none of the four requesting units is linked to a corresponding one of the selected units through the cross-point matrix. Whenever the output of one of the AND-gates 58 goes "false," the corresponding bit position in the SU Available register 30 is reset to 0 by the next clock pulse.

The Priority Granted register 32 has each of its four bit positions set to 1 by the output of an associated logical AND circuit, two of which are indicated at 60. Each logical AND-circuit 60 has two inputs, one of which is connected to one of the four outputs of the Compare circuit 38, indicating which requesting unit has been granted priority, and the other input being derived from the output of the Request Granted circuit 34. The latter circuit includes four logical OR circuits, two of which are indicated at 64, each OR circuit receiving 10 inputs from the output of the exchange control circuit 26. Thus, the output of any one of the logical OR-circuits 64 is true when the corresponding one of the four requesting units is connected to any one of the selected units through the cross-point matrix. When any of the outputs of the AND-circuits 60 is true, the corresponding bit position of the Priority Granted register 32 is set to 1 by the next clock pulse. Each bit position of the Priority Granted register 32 is reset to 0 when the corresponding one of the four outputs of the Request Granted circuit 34 goes "false," as indicated by the output of an inverter circuit 66. The four output bits of the Priority Granted register 32 are combined with the four outputs from the Compare circuit 38 through four logical OR-circuits 68. Thus, once priority is granted to a particular requesting unit, the Priority Granted register 32 maintains the priority level to the exchange control circuit 26 to maintain communication between the particular requesting unit and the selected unit.

The Compare circuit 38 grants priority on one of four output lines from one of three inputs, namely, an input derived from the first stage SR-1 of the stack register 44, the second stage SR-2 of the stack register 44, or from the scanner 36. Each stage of the stack register has five states, four states representing the four different requesting units and the fifth state representing an empty condition. The scanner 36, of course, has four states which are activated in sequence in synchronism with the clock pulses. Thus, during any particular clock pulse interval, the scanner identifies one of the four requesting units.

The four states of the SR-1 stage of the stack counter 44 are connected directly to four logical OR circuits, two of which are indicated at 70, in the Compare circuit 38 so that the Compare circuit 38 provides an output on one of the four output lines depending upon which of the four states the SR-1 stage of the stack register has previously been set. If the SR-1 stage is empty, of course, none of the four outputs from the Compare circuit 38 will be "true."

If priority is to be granted to the requesting unit identified by the second stage SR-2, the output of a first priority gating circuit, indicated at 72, is "false." This output is inverted by an inverter 74 and applied to a gate 76 which gates the four output states of the SR-2 stage of the stack register to the four OR-circuits 70 of the Compare circuit 38. If priority is to be granted to the register unit identified by the scanner 36, a second priority gating circuit, indicated at 78, is also "false." The output is inverted by an inverter 80 and applied to an AND-gate 82 together with the inverted output from the first priority gating circuit 72. The output of the AND-gate 82 is applied to a gating circuit 84 which gates the four output lines from the scanner 36 to the respective OR-gates 70 in the Compare circuit 38.

Thus, it will be seen that if the first priority gating circuit 72 output is "true," priority is granted to the requesting unit identified by the contents of the SR-1 stage of the stack register 44. If the output of the first priority gating circuit 72 is not "true," but the output of priority gating circuit 78 is "true" then priority is granted to the requesting unit identified by the contents of the second stage SR-2 of the stack register 44. If the output of the second priority gating circuit 78 is also "false," then priority is granted to the requesting unit identified by the scanner 36.

The internal logic of the two priority gating circuits 72 and 78 is identical and, therefore, only the logical elements of the first priority gating circuit 72 are shown in detail in FIG. 3A. The input to the priority gating circuit consists of three groups of four lines each. The first group of lines is from the four output states of the highest priority stage SR-1 of the stack register 44. These lines provide one input to each of four AND gates, two of which are indicated at 86. The outputs of the four AND gates are coupled to the common output through an OR-circuit 88. The other input to each of the AND-gates 86 is derived through four OR circuits, two of which are indicated at 90. These OR circuits respond to two input conditions. The first input is derived from the four output lines of the request granted circuit 34. This input establishes before the priority is granted and the register 30 is reset, which of the requesting units seeking access can now be granted access to available accessible units, as indicated by the condition of register 30. The second input is derived from the Request register 28 through an inverter 92. The purpose of the second input is to determine if by chance the request has been removed after priority has been granted. The output of the inverter 92 will only be "true" on the corresponding one of the four lines if that request from the corresponding requesting unit no longer is "true." As will hereinafter become apparent if the output of the first priority gating circuit 72 goes "true," indicating priority is granted to the requesting unit identified by SR-1 has been removed, the stack register 44 will be cleared of its request for priority from the SR-1 stage of the stack register 44 and the stack register adjusted to load SR-1 from SR-2. The output from the Request Granted circuit 34 insures that the priority from the first priority gating circuit 72 goes "true" only if access has been granted to the requesting unit identified by the contents of the SR-1 stage of register 44.

The second priority gating circuit 78 is identical except that it responds to the condition in the second priority register section SR-2 of the stack register 44.

Whenever a requesting unit seeks one of the selected units which is not available, identification of the requesting unit is placed in the stack register 44 for future reference when the selected unit becomes available. Such requests of unavailable selected units must be placed in the stack starting with the highest priority position SR-1 to the lowest priority position SR-3 in the order such requests are received from the requesting units. In addition, whenever a request stored in the stack register is later completed, it must be cleared from the stack register and the lower order priority requests moved upwardly to the higher order positions in the stack. This is accomplished by the stack register control circuit 48.

The various stages of the stack register 44 are set from the scanner 36, since during the clock pulse time in which a priority request is loaded in the stack register, the scanner is identifying the requesting unit being serviced. Each of the stages is set to one of four states, according to the condition of the scanner, by four logical AND circuits, two of which are indicated at 100 for the highest priority stage at SR-1, at 102 for the second highest priority stage SR-2, and 104 for the lowest priority stage SR-3. Considering the AND-circuits 100 for the highest priority stage SR-1, each receives one input from the scanner 36. In addition, all four AND circuits receive an input level from the fifth state from the SR-1 register stage, indicating that the stage is empty. A third input common to all four AND gates indicates, in a manner hereinafter to be described, that a stack priority request, indicated as SPR, is present.

The AND-gates 102 associated with the second priority SR-2 are substantially the same except that the signal indicating that the register is empty is applied to an AND-circuit 106 together with the output of an inverter 108 to which the fifth, or empty level, of the first priority stage SR-1 is applied. Thus, the second priority stage can only be set if the first priority stage is not empty. Similarly the third priority stage is set only when the two higher order priority stages are empty, as indicated by the output of an AND-circuit 110 to which the fifth, or empty, level of the lowest order stage SR-3 is applied together with the output of an inverter 112 to which the output of the AND-circuit 106 is applied.

The stack priority request level, applied to the three groups of four AND-gates, 100, 102, and 104, is "true" whenever a particular requesting unit seeks to communicate with a selected unit which is not available and the request has not already been placed in the stack register 44. The stack priority request level is derived from one of four AND gates, only two of which are indicated at 114, the output of the four AND gates being connected to a common output through an OR-circuit 116. Each of the four AND-circuits 114, one for each of the four requesting units, responds to five input conditions. The first input is derived from the Request register 28, indicating the corresponding requesting unit is making a request. The second input is derived from the corresponding one of the four outputs of the scanner 36, indicating that the scanner is pointing to the particular requesting unit. This insures that if more than one request is made simultaneously, the requests will be serviced in sequence in response to the stepping of the scanner 36 during successive clock pulse intervals. The third input to each of the AND gates is derived form the corresponding one of the four outputs of the Request Granted network 34 through an inverter 118. Thus, the third input to each of the logical AND-circuits 114 is "true" only if the corresponding requesting unit has not established an output signal from the exchange control 26.

The fourth input to each of the AND-circuits 114 is derived from the stack register 44 and indicates that the corresponding requesting unit is not already identified by one of the stages of the stack register. To this end, the four output states to each of the stack register stages is connected, respectively, to one of four OR circuits, two of which are indicated at 120. The outputs of each of the four OR circuits are connected through an inverter 122 to the corresponding one of the four AND-gates 114. The fifth input to each of the AND-gates 114 is derived from the output of the AND-gate 82, indicating that priority is granted to the requesting unit identified by the scanner 36.

Whenever a selected unit becomes available to a requesting unit whose request has been placed in the stack register 44, that request must be removed from the stack register 44 and the remaining requests moved up in priority to the higher order priority stages of the stack counter. This is accomplished by a pair of AND-gates 124 and 126. The AND-gate 124 effects transfer between the lowest order stage SR-3 and the second order stage SR-2, while the gate 126 effects transfer between the second priority stage SR-2 and the first priority stage SR-1. The gate 126 is controlled by the output of the first priority circuit 72. The gating circuit 124 is operated by either the output of the first priority circuit 72 or the second priority circuit 78 through an OR-circuit 128.

In summary, the above circuit operates to complete a connection between a requesting unit and a selected unit designated by the requesting unit during a clock interval in which the scanner points to the particular requesting unit. The scanner permits the circuit to handle simultaneous requests by more than one requesting unit. If the selected unit designated by the requesting unit is busy, the request is stored in the stack register. If additional requesting units designate the same selected unit, their requests are also stored in the stack register on a lower priority basis, giving highest priority always to the first unit making the request. Whenever an accessible unit is released by a requesting unit, the corresponding output of the exchange control 26 goes off. This causes the SU Available register 30 to have the corresponding flip-flop turned on again, indicating the particular accessible unit is again available. Assuming other requesting units are waiting for access to the particular available unit, as soon as the SU Available register 30 is changed, one or more of the 40 lines from the exchange control 26 may momentarily go true. This turns on one or more of the outputs from the Access Granted circuit 34. Priority is resolved by none, one, or both of the priority circuits 72 and 78 going "true" at their respective outputs, thereby turning off one or both of gates 76 and 84. As a result only the requesting unit having highest priority to a particular accessible unit maintains the corresponding output line "true" from the exchange control 26 at the time of the next clock pulse. This same clock pulse sets the Priority Granted register 32 to indicate that the highest priority requesting unit has been granted access to the accessible unit. This clock pulse also turns off the proper flip-flop in the SU Available register 30, indicating that the particular accessible unit is once again busy and therefore not available.

What is claimed is:

1. In combination with a system having a first group of $m$ number of units which can communicate with any one of a second group of $n$ number of units through an $m \times n$ cross-point switching matrix by generating a request signal identifying the unit in the first group and an address signal identifying a unit in the second group, apparatus for controlling said switching matrix comprising scanning means for repeatedly identifying in time sequence each of the units in the first group, storage means having a plurality of stages, each stage being adapted to store signals identifying any one of the units of the first group, matrix control gating means having a plurality of separate outputs connected respectively to each cross point in the switching matrix to control the connection at each cross point, register means for storing information in electrically coded form, means synchronized with the scanning means and responsive to the output of the matrix control gating means for storing information in the register means indicating as to each unit of the second group whether the output of the gating means has completed a connection to the particular unit, means coupling the output of the register means to the matrix control gating means, priority means coupled to the output of several of the stages of the storage means and the output of the matrix control gating means for selectively coupling the output of the scanning means and at least one stage of the storage means to the matrix control gating means, the gating means activating a particular output to a cross point in the matrix in response to the corresponding request signal and address signal from a unit in the first group when the output from the register means indicates the addressed unit of the second group is available and the output of one of the stages or the scanning means identifies the associate unit of the first group.

2. Apparatus as defined in claim 1 further including means responsive to the output of the gating means for setting the lowest order empty stage in the storage means in response to the output of the scanning means when the output of the gating means indicates a request to a particular address has not been gated whereby the identification of any requesting unit in the first group seeking an unavailable unit in the second group is stored in the storage means in predetermined order.

3. Apparatus as defined in claim 2 further including means for shifting the contents of the storage means, and means responsive to the output of the matrix control gating means and the contents of the storage means for shifting the contents when a connection is completed to a unit whose identification is stored in the storage means.

4. Apparatus for selectively completing electrical connections between any one of a first group of electrical signal generating and/or receiving units and any one of a second group of electrical signal generating and/or receiving units, said apparatus comprising means associated with each of the units of the first group for initiating a request signal identifying the associated unit of the first group seeking connection to a unit of the second group and initiating an address signal identifying a particular unit of the second group to which a connection is being requested, cross-point switching means for selectively completing an electrical connection between any of the first group of units and any of the second group of units, and control means responsive to the request signals and address signals from said request and address signal initiating means for operating the cross points of said switching means to complete electrical connections between the requesting units of the first group and the addressed units of the second group, said control means including scanning means successively identifying each of the units in the first group in time sequence at the output thereof, register means coupled to the output of the control means for generating output signals identifying which units of the first group are currently connected by the switching means to units of the second group, storage means having a plurality of storage information locations, and means coupled to the output of the scanning means, the output of the request signal initiating means, the output of each of the locations in the storage means, and the output of the means identifying which units of the first group are connected to units of the second group for inserting the output of the scanning means into a predetermined location in the storage means whenever the scanning means identifies a unit of the first group that is requesting connection to a unit of the second group, the connection has not been initiated by the output of the control means, and the unit identified by the scanner is not identified by the contents of any location in the storage means.

5. Apparatus as defined in claim 4 further including gating means for providing signals from the control means to the cross points of the switching means, said gating means being coupled to the output of said register means, the output of the request signal and addressing signal initiating means, the output of the scanning means, and the output from predetermined locations in said storage means for providing an output signal to a selected cross point of the switching means whenever a unit of the first group identified by the contents of either the storage means or the scanner is addressing a unit of the second group which the register means indicates is not connected to a unit of the first group.

6. Apparatus as defined in claim 5 wherein said means for inserting the output of the scanning means in the storage means includes means indicating the order in which the contents of the storage means were inserted, and priority resolving means for selectively gating signals stored in the several locations in the storage means and the output of the scanner to said gating means on a fixed priority basis, the priority being in the reverse order of said order indicating means with the scanner output having the lowest priority.

7. Apparatus as defined in claim 6 wherein said order indicating means includes means for transferring the contents of one location in the storage means to another location in predetermined order, and means for operating said transferring means whenever the contents of one of said locations is used to control the switching means.

8. Apparatus as defined in claim 7 wherein the storage means includes a plurality of stages corresponding in number to one less than the number of requesting units, and said priority resolving means gates only signals stored in all but one of the stages.

* * * * *